July 28, 1931. G. R. FOLDS 1,816,008
CABLE TERMINAL
Filed Feb. 24, 1930
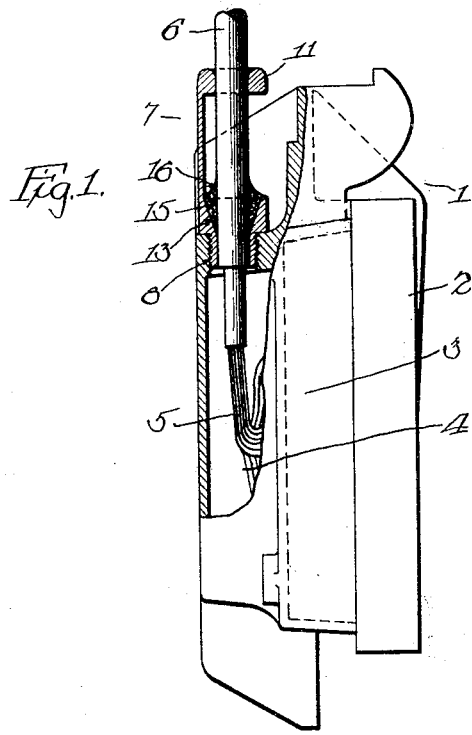
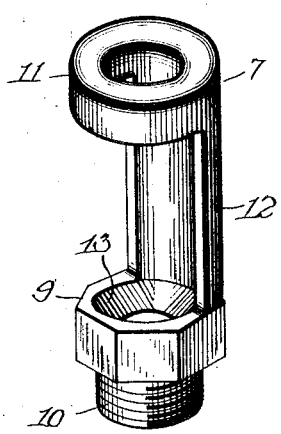
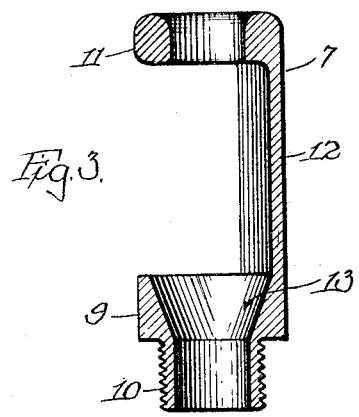
Inventor:
George R. Folds Patented July 28, 1931

1,816,008

UNITED STATES PATENT OFFICE

GEORGE R. FOLDS, OF EVANSTON, ILLINOIS, ASSIGNOR TO COOK ELECTRIC COMPANY, OF CHICAGO, ILLINOIS, A CORPORATION OF ILLINOIS

CABLE TERMINAL

Application filed February 24, 1930. Serial No. 430,784.

My invention relates to cable terminal structures and more particularly to structures for terminating lead covered aerial cables, such, for example, as telephone cables. In United States Letters Patent No. 1,716,531 granted to Lawrence M. Persons on July 11, 1929, and assigned to the assignee of the present case, a cable terminal is disclosed which is made of pressed steel and which is formed with a recess or pocket in the rear wall to provide a soldered connection with the cable stub end. Solder is preferably puddled in this recess or pocket and the cable stub is embedded in the solder. The terminal box is carried by a mounting plate and clamping means provide a rigid connection at a distance from the soldered joint to prevent transmission of vibration thereto. Although the disclosure of these features were in connection with a cable terminal box of pressed steel construction and it was intended, however, by such disclosure that they might readily be adopted to cable terminal boxes of cast construction, I show in the present case a form of cable stub adaptor incorporating these novel features and in the form of an attachment readily lending itself to a cable terminal box of cast construction.

The vibration transmitted along the cable creates a strain on the lead sheath where the cable enters the box which it is desirable to prevent. There is a tendency for this vibration to be transmitted to the lead sheath at this connecting point, particularly where the installation is on a telephone pole. Vibration of the pole when transmitted to the lead sheath does, as a matter of fact, break the sheath in a short period of time. In soldering the cable, the surface is scored and heated. A positive change of the molecular structure of the lead sheath is apt to occur, which will weaken the sheath and assist in its rapid crystallization when vibrated. As stated above, the aforesaid patent disclosed means for preventing vibration from continuing beyond a certain point along the cable sheath, thereby restraining the vibration from reaching the aforesaid connecting point of the sheath. In the present disclosure, I provide, as a part of the unique construction of the cable stub adaptor, means in the form of a rigidly supported ring through which the cable stub passes and is held firmly gripped to prevent vibration from being transmitted to the soldered union.

Other objects and advantages of the invention will be apparent from the following detailed description when taken in connection with the accompanying drawings which forms a part hereof. In the drawings, Figure 1 is a side view, partly in elevation and partly in section, of a terminal box having a cable stub adaptor attached thereto and which embodies the present invention;

Fig. 2 is a perspective view of the cable stub adaptor; and

Fig. 3 is a vertical sectional view of the same.

Although it will be understood that the present invention is capable of application to any form or type of cable terminal box, a terminal box 1 is shown having the usual cover 2, a compartment 3 in which is disposed the usual contact mounting plate (not shown), there being a cavity 4 formed in the rear part of the box into which the cable conductors extend to be secured to binding posts on the rear face of the contact mounting plate. After the connections to the binding posts are completed, cavity 4 may be filled with any suitable molten insulating compound which will harden upon cooling and which will serve to maintain these connections in their proper arrangements and in proper moisture-proof relation.

The cable conductors illustrated at 5 are brought into cavity 4 by a cable stub 6, the end of which enters the cavity through an adaptor designated generally 7 adapted for attachment to terminal box 1 at an internally threaded opening 8.

Adaptor 7 is preferably a casting, unitary in construction and capable of fitting practically any type of box. It comprises a body portion 9 provided with hexagonal sides permitting application of a wrench, a hollow externally threaded nipple 10, and an annular ring 11 positioned at a distance from and in rigid relation to body portion 9. An extension or strap member 12 furnishes the connection between body portion 9 and annular ring 11. Body portion 9 may have a pocket 13 formed therein which is in alignment with hollow nipple 10 and annular ring 11.

As illustrated in Figure 1, cable stub 6 is brought downwardly through annular ring 11 into pocket 13 and into hollow nipple 10 so that the conductors may enter cavity 4 and be attached to their respective binding posts. Solder 15 is then puddled in pocket 13 to embed the end of cable stub 6 in the solder to thereby provide a secure soldered joint which holds the lead sheath rigidly at this point. Due to the molecular action of solder, the latter tends to rise upwardly of the surface of the embedded cable stub as at 16 in Figure 1. It has been pointed out in the aforementioned patent that it is very difficult to prevent crystallization of the lead sheath of cable 6 due to the fact that the lead sheath is scored and heated before the solder is puddled in pocket 13. The scoring and heating of the lead sheath is apt to cause molecular disarrangement of the lead which will, of course, more quickly crystallize when subjected to strain, this strain resulting in the instant case by vibrations transmitted along the telephone pole to the cable at this connection where the box is mounted upon telephone poles. It has been found that the positioning of a ring, which preferably rigidly grips the cable stub at a distance from the soldered connection, will effectively check vibration of any great extent.

The cable terminal box disclosed herein is preferably intended to be of cast construction to show the apt adaptation of the cable stub adaptor embodying the essentials of the present invention. It will be understood, however, that a box of drawn metal or other construction may be very aptly provided with a threaded opening 8 or its equivalent to receive nipple 10.

The cable stub adaptor 7 is simple and inexpensive and allows ready application of a soldered joint wherein the solder has been puddled in a pocket to embed the cable stub therein and, in addition, allows the use of a rigid connection at a distance from the soldered joint which prevents transmission of vibration thereto. It is obvious that the cable stub adaptor 7 may be quickly fitted into position without requiring any substantial modification of the terminal box.

Without further alteration the foregoing will so fully explain the advantages of my invention that others may, by applying current knowledge, readily adapt the same for use under varying conditions of service, without eliminating certain features which may properly be said to constitute the essential items of novelty involved, which items are intended to be defined and secured to me by the following claims.

I claim:

1. A cable stub adaptor permitting the attachment of a cable stub to a cable terminal comprising a body portion having a pocket provided therein to receive the end of said cable stub, solder in said pocket, and a fitting on said body portion adapted for attachment to said cable terminal, said fitting having an opening therein coextensive with said pocket and through which said cable stub extends whereby the said solder will surround the periphery of said cable stub and embed the same in said pocket.

2. A cable stub adaptor permitting the attachment of a cable stub to a cable terminal comprising a body portion having a pocket provided therein to receive the end of said cable stub, solder in said pocket whereby the end of said cable stub will be embedded in said solder, means for attaching said body portion to said cable terminal, and means on said body for gripping said cable stub at a distance from said pocket.

3. A cable stub adaptor permitting the attachment of a cable stub to a cable terminal comprising a body portion having a pocket provided therein to receive the end of said cable stub, solder in said pocket whereby the end of said cable stub will be embedded in said solder, a fitting on said body portion adapted for attachment to said cable terminal, and a collar carried by the body portion for gripping said cable stub at a distance from its end.

4. A cable stub adaptor permitting the attachment of a cable stub to a cable terminal box comprising a casting having a pocket formed therein to receive the end of a cable stub and solder to embed the cable stub end therein, and a threaded nipple adapted for fastening within a threaded opening in said cable terminal box.

5. A cable stub adaptor permitting the attachment of a cable stub to a cable terminal box comprising a casting having a pocket formed therein to receive the end of a cable stub, solder for said pocket to embed the cable stub therein, an outwardly extending hollow threaded nipple adapted for reception in a similarly internally threaded opening in said cable terminal box, and an annular ring arranged to embrace the cable stub at a distance from said solder filled pocket, said pocket, nipple and annular ring being substantially in alignment with each other.

In witness whereof, I have hereunto subscribed my name.

GEORGE R. FOLDS.